US007464803B2

(12) United States Patent
Cashimere et al.

(10) Patent No.: US 7,464,803 B2
(45) Date of Patent: Dec. 16, 2008

(54) ORIENTATING APPARATUS

(75) Inventors: Brian J. Cashimere, Rochester, NY (US); Gerald N. Walter, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 184 days.

(21) Appl. No.: 11/491,884

(22) Filed: Jul. 24, 2006

(65) Prior Publication Data

US 2008/0017477 A1    Jan. 24, 2008

(51) Int. Cl.
*B65G 47/24*    (2006.01)
(52) U.S. Cl. ................... 198/396; 198/443; 198/389
(58) Field of Classification Search ............. 198/389, 198/396, 443; 193/45, 46, 48
See application file for complete search history.

(56) References Cited

U.S. PATENT DOCUMENTS

| 1,732,283 | A | * | 10/1929 | Schlaupitz | 198/396 |
|---|---|---|---|---|---|
| 3,608,271 | A | * | 9/1971 | Pilat | 53/212 |
| 4,721,230 | A | * | 1/1988 | McKnight | 221/173 |
| 4,741,428 | A | * | 5/1988 | Taniguchi et al. | 198/397.04 |
| 5,491,501 | A | * | 2/1996 | Dietl et al. | 347/86 |
| 5,934,505 | A | * | 8/1999 | Shimada | 221/236 |
| 6,006,890 | A | * | 12/1999 | Crawford | 198/396 |
| 6,032,783 | A | * | 3/2000 | Saito et al. | 198/390 |
| 7,150,349 | B2 | * | 12/2006 | Meynieux | 198/533 |
| 2001/0052446 | A1 | * | 12/2001 | Saito et al. | 198/396 |

* cited by examiner

*Primary Examiner*—Mark A Deuble
(74) *Attorney, Agent, or Firm*—Donna P. Suchy; David A. Novais

(57) ABSTRACT

An orientating apparatus and associated method includes an agitator, one or more channels adjacent the agitator, and a lower component delivery portion. The agitator is powered by a drive assembly, which induces a motions in relation to the channels. The channels are designed such that a component for orienting can only pass through the channels in a preferred orientation, and the agitator provides opportunities for the components to achieve proper orientation to enter the channels. This allows the components to pass through the channels to the staging portion in an orientated manner. This orientating apparatus, intended for the automatic positioning of wicks, will work on manufacturing lines with any number of apparatus or parts, as long as it is generally adjacent the utilization point.

17 Claims, 10 Drawing Sheets

ORIENTATING APPARATUS

FIELD OF THE INVENTION

The invention relates generally to the field of manufacturing, such as inkjet ink tank manufacturing, and more particularly to an orientating apparatus intended for the automatic positioning of parts, which nominally are all of the same size.

BACKGROUND OF THE INVENTION

A common problem in manufacturing is the need to assemble one or more components in a preferred orientation into specific location(s) on the final assembled device. Such components may have some degree of symmetry, but are less symmetric than a sphere. Typically the components are supplied as a batch of nonoriented parts. Of course, it is possible for such parts to be manually oriented and assembled into the final device, but in order to achieve faster assembly throughput and lower cost, some means of automatic orientation and positioning is desirable.

A commonly used apparatus for selecting parts out of a batch is the vibratory bowl feeder. The vibratory bowl feeder shakes the batch of parts and lets them fall into locations that will lead to their subsequent assembly positions. Vibratory bowl feeders are typically expensive and have a large footprint. It is desirable to have a smaller and less expensive apparatus that can select, orientate and position components from a non-oriented batch so that the components may be readily assembled into the final device.

One particular type of application which would benefit from such an apparatus is the assembly of one or more wicks into an ink tank for an inkjet printhead. Inkjet printers, printheads and ink tanks are well known in the art. Typically the ink tank will have some means of pressure regulation incorporated so the ink is held within a desired pressure range and does not dribble out the nozzles of the printhead. Among the different types of pressure regulation means, there is the porous media and a wick. The porous media is typically a rectangular shaped piece of foam or felt which is located within a chamber of the ink tank. Ink is allowed to soak into the porous media, and capillary action provides the pressure regulation. In order to supply ink from the porous media into the adjacent printhead, it is well known in the art to have a wick member positioned adjacent the porous media, so that it contacts the porous media on one side, and a filter on a printhead standpipe on the other side of the wick.

Such wicks may be of various shapes, but typically they are longer and wider than they are thick and include a pliant and porous material. See, for example, U.S. Pat. No. 5,491,501 in which the wick is referred to as a scavenger member.

The present invention describes a manufacturing apparatus and associated method that include an orientating apparatus that allows for efficient and accurate assembly of a component into a final device, including, but not limited to wick insertion into an ink tank. This eliminates the need for other operations, such as a secondary wick insertion station and associated operators. In addition to improving the cycle time for assembly, this method and apparatus are also found to generate fewer defects and a lower level of contamination in the assembled final device.

SUMMARY OF THE INVENTION

In accordance with an object of the invention, both a system and a method are provided for improving the manufacturing of inkjet ink tanks, and specifically the efficient and accurate wick placement into an ink tank during manufacturing.

The orientating apparatus and associated method includes an agitator, one or more channels adjacent the agitator, and a lower component delivery portion at a utilization point. The agitator induces the components to move in relation to the channels. The lower component delivery portion includes one or more staging portions that are adjacent the channels. This allows the components to pass through to the staging portion in an orientated manner. This orientating apparatus, intended for the automatic positioning of wicks, will work on manufacturing lines with any number of apparatus or parts, as long as it is generally adjacent the utilization point.

While the specification concludes with claims particularly pointing out and distinctly claiming the subject matter of the present invention, it is believed the invention will be better understood from the following detailed description when taken in conjunction with the accompanying drawings.

BRIEF DESCRIPTION OF THE DRAWINGS

For a better understanding of the characteristics of this invention the invention will now be described in detail with reference to the accompanying drawings, wherein.

DETAILED DESCRIPTION OF THE INVENTION

The present description will be directed in particular to elements forming part of, or cooperating more directly with, apparatus and methods in accordance with the present invention. It is to be understood that elements not specifically shown or described may take various forms well known to those skilled in the art.

Figure 1:
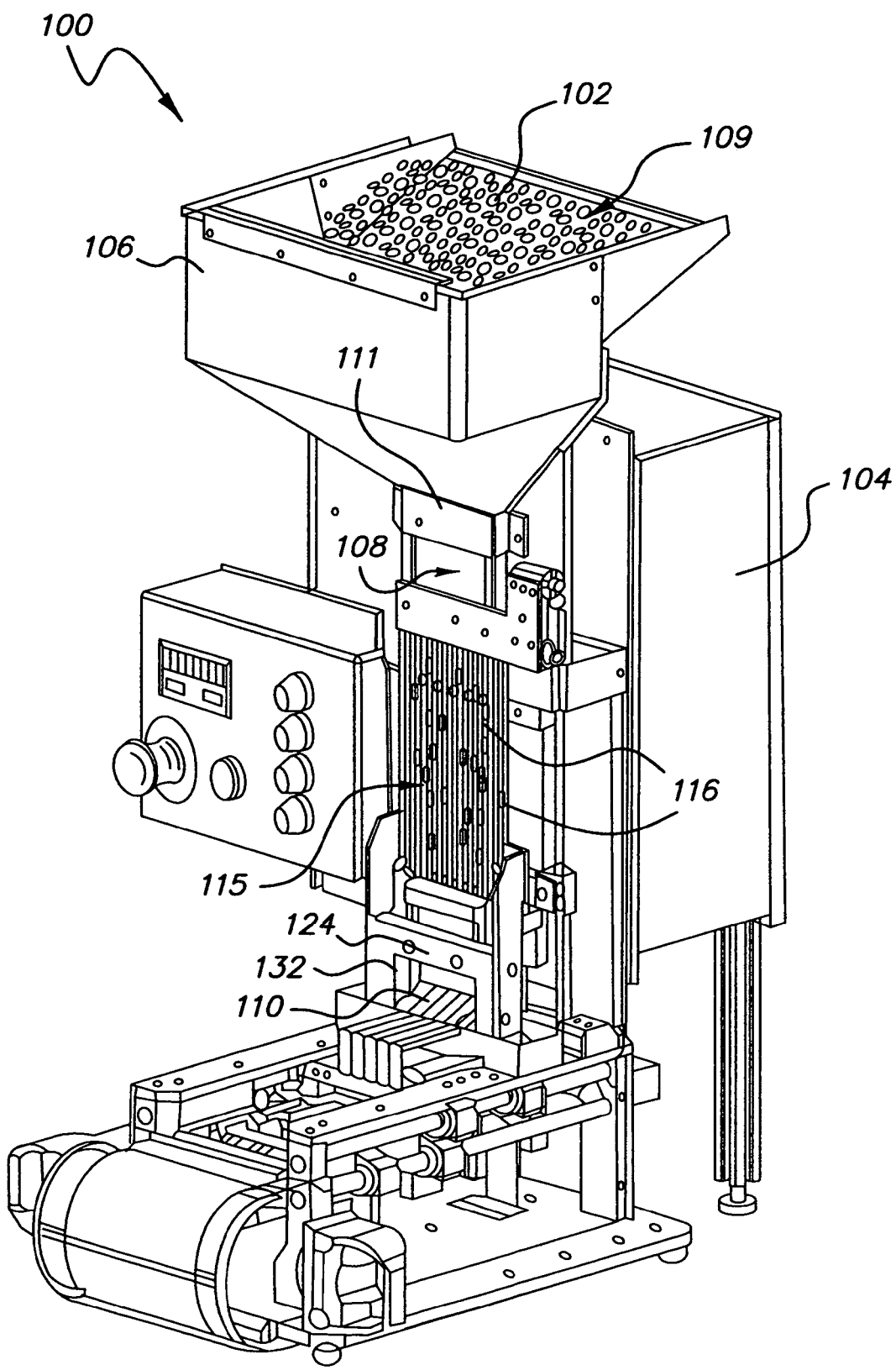
FIG. 1 is a schematic view of an orientating apparatus.

FIG. 1 shows an apparatus 100, also referred to as the orientating apparatus, for orientating components 102 of an ink tank during assembly. A frame 104 preferably supports the orientating apparatus 100 including a component source, such as a hopper 106, to contain the components, which can be transported to the hopper in a variety of ways including a conveyer system (not shown). Hopper 106 may optionally have a cover 109 to prevent external contaminants from landing on the components, and also to keep components 102 from bouncing out of the top of the hopper. Components 102 have somewhat random orientation in hopper 106. The orientating apparatus 100 orients the components 102 by causing them to pass through a feed channel assembly 115 which will only allow the components to pass in a preferred orientation.

Agitator 108 causes components 102 to reorient at the channel inlets 120 of the feed channel assembly until they assume an orientation, which is close enough to the preferred orientation that they can enter the channel inlets 120. The term "agitator" is used herein to generically describe a means of reorienting components 102 so that they eventually are disposed in an orientation that allows entry into the channel inlets 120. Example types of agitators include those that act by mechanical contact with the components near the channel inlets, those that act by puffs of air to reorient the components, those that act by gentle stirring or movement of the components, those that act by magnetism or electrostatic forces, etc. or a combination of one or more of the above. In other words, "agitate" as used herein means to change the arrangement of the components. The agitation can be accomplished by a sudden force, or by a gentle motion.

It will be understood by those skilled in the art that the hopper 106 could be replaced by a number of other feed mechanisms, including a conveyer system directly in communication with an agitator 108. The components move from the hopper through the feed channel assembly 115 and towards a utilization point 110 under a force, which in this embodiment is gravity. It will be understood by those skilled in the art that a feed channel assembly 115 having somewhat vertical feed channels 116 is compatible with a simple gravity fed system, but that other means to supplement or replace gravity as the force for moving the components could include systems using moving air and differential air pressure for example. The orientating apparatus enables the ink tank manufacturing line to meet throughput requirements, reduce part defects, and eliminate secondary production stations and operators, resulting in improved efficiency and significant capital savings.

Figure 2:
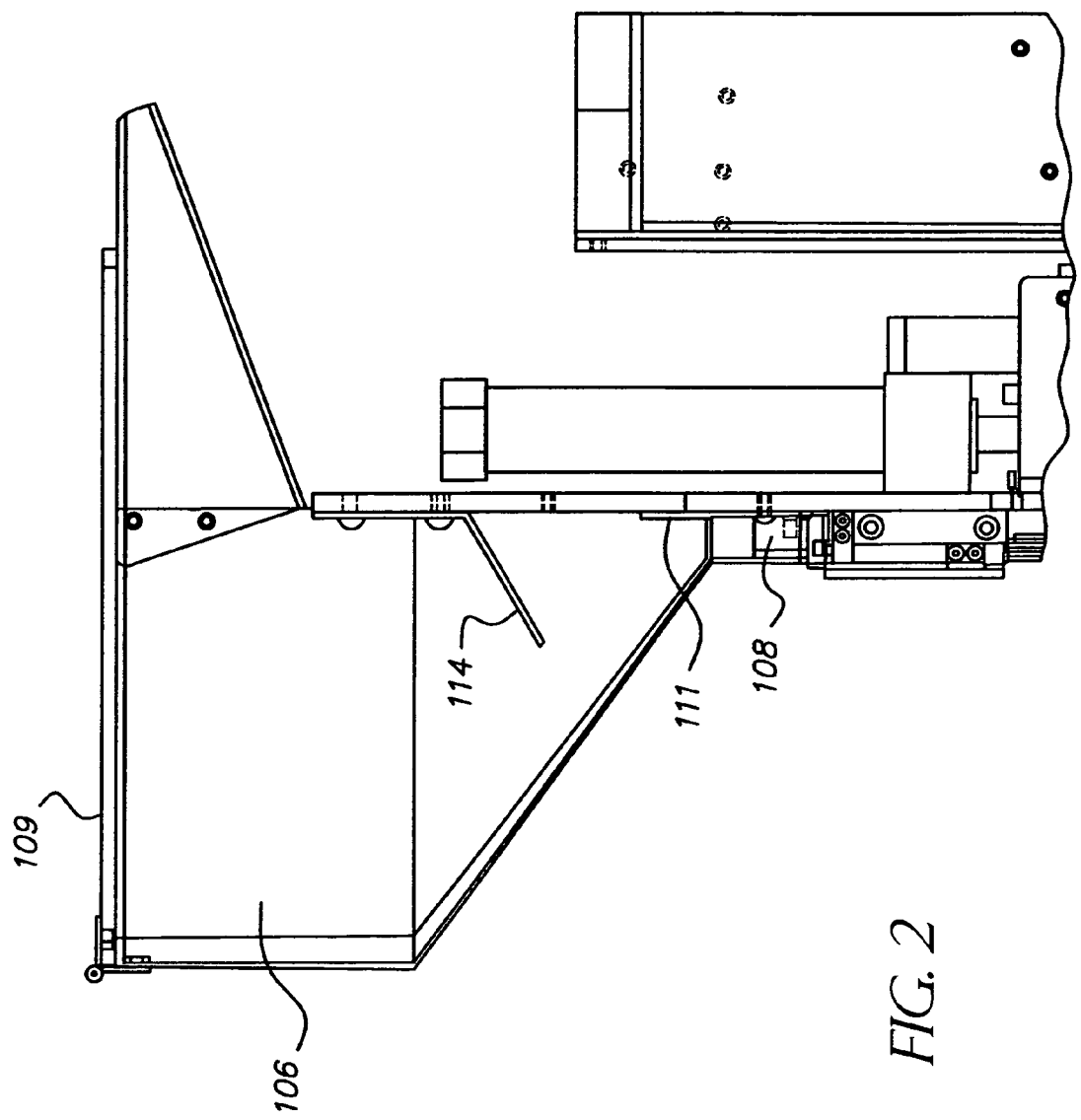
FIG. 2 is a side view showing a portion of the orientating apparatus of FIG. 1.

FIG. 2 shows a side view of the hopper 106 positioned to receive the components and move them towards the agitator 108. In the preferred embodiment as shown in FIG. 2, the hopper has one or more baffles 114 to feed components at a constant rate and regulate the load or feed rate to one or more channels 116 (see FIG. 1). The outlet 111 of the hopper 106 is adjacent to the entry of the feed channel assembly 115. A window (not shown) can be incorporated in the orientating apparatus to aid the removal of defective wicks, such that mis-seated or defective wicks could be blown out the window and collected. For example, if there is a jam, a window or trap door would allow for a quick recovery (empty the hopper, clearing the jam). One skilled in the art would understand that the system could also incorporate various access doors to provide direct access to the interior of the apparatus to clear jams or remove particulate matter such as with a blower or other means. In one preferred embodiment the hopper cover 109 acts as an access door for direct access to the interior of the hopper.

Before discussing the detailed design of feed channel assembly 115 in the preferred embodiment, it is helpful to describe the geometries of the ink tank and wick, for the particular example of using the orientating device to orient wicks so that they may be readily assembled into corresponding tanks. While the invention is useful for assembling wicks into single chamber ink tanks, it has its greatest benefits for assembling multichamber ink tanks, where, for example, each chamber corresponds to a different ink or printing fluid.

Figure 3:
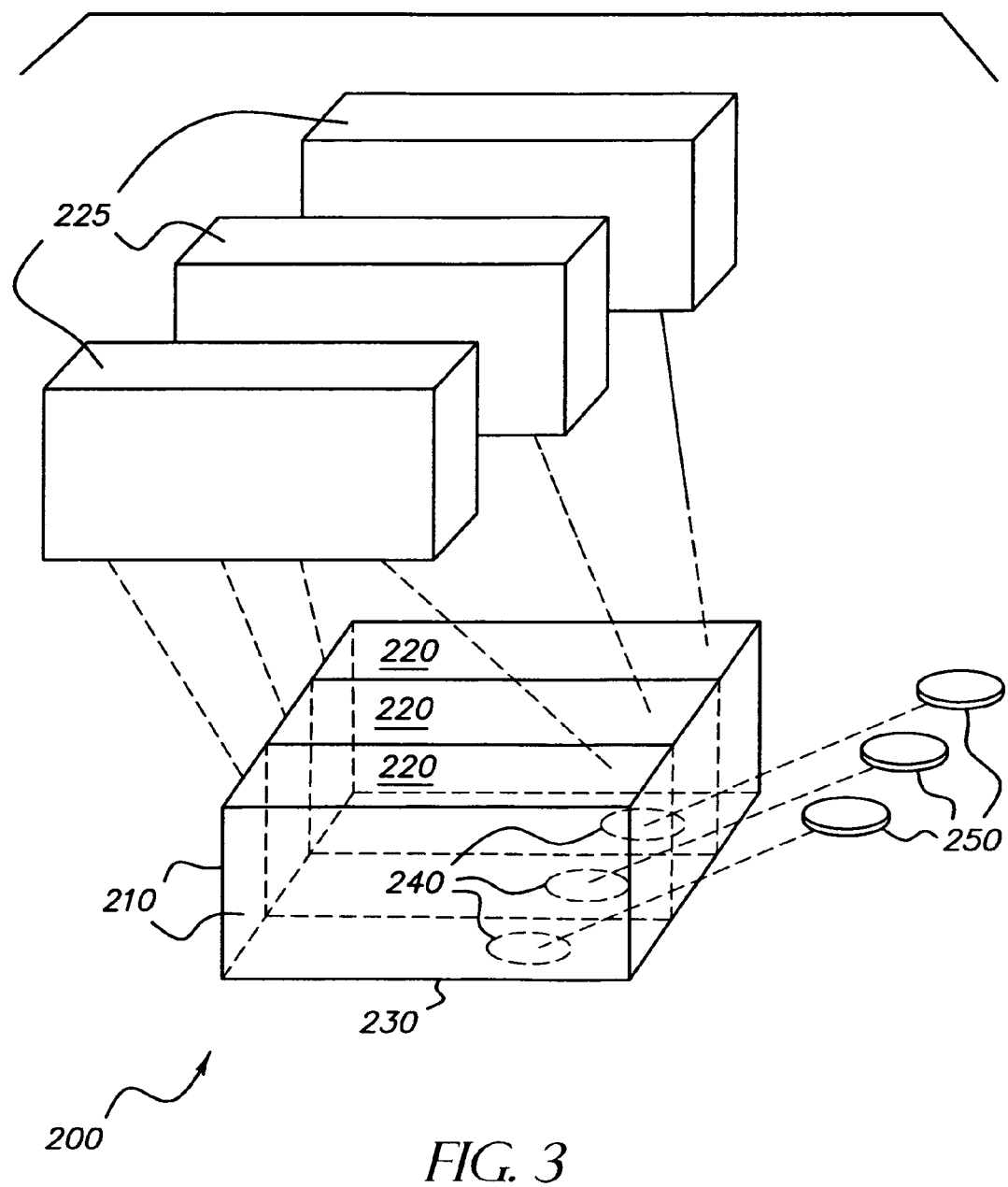
FIG. 3 is an exploded view of a multichamber ink tank.

FIG. 3 shows an exploded view of a multichamber ink tank assembly 200, including four exterior lateral walls 210, several internal chambers 220, porous media 225 to be inserted in chambers 220, a bottom wall 230 of the ink tank, several wick receptacles 240 (one wick receptacle corresponding to each chamber 220) on bottom wall 230, and several wicks 250 to be inserted into the corresponding wick receptacles 240. The ink tank lid is not shown. To simplify FIG. 3, only three chambers are shown, but ink tanks may have more or fewer chambers. Note that in this example, the wick receptacle 240 is oval-shaped. Note also that wick 250 is an oval-shaped disk and is of substantially the same size as the receptacle 240. Of course, wicks may have other shapes including circular disks, or they may be rectangular or square-as long as they correspond to a wick receptacle of similar size and shape.

Figure 4:
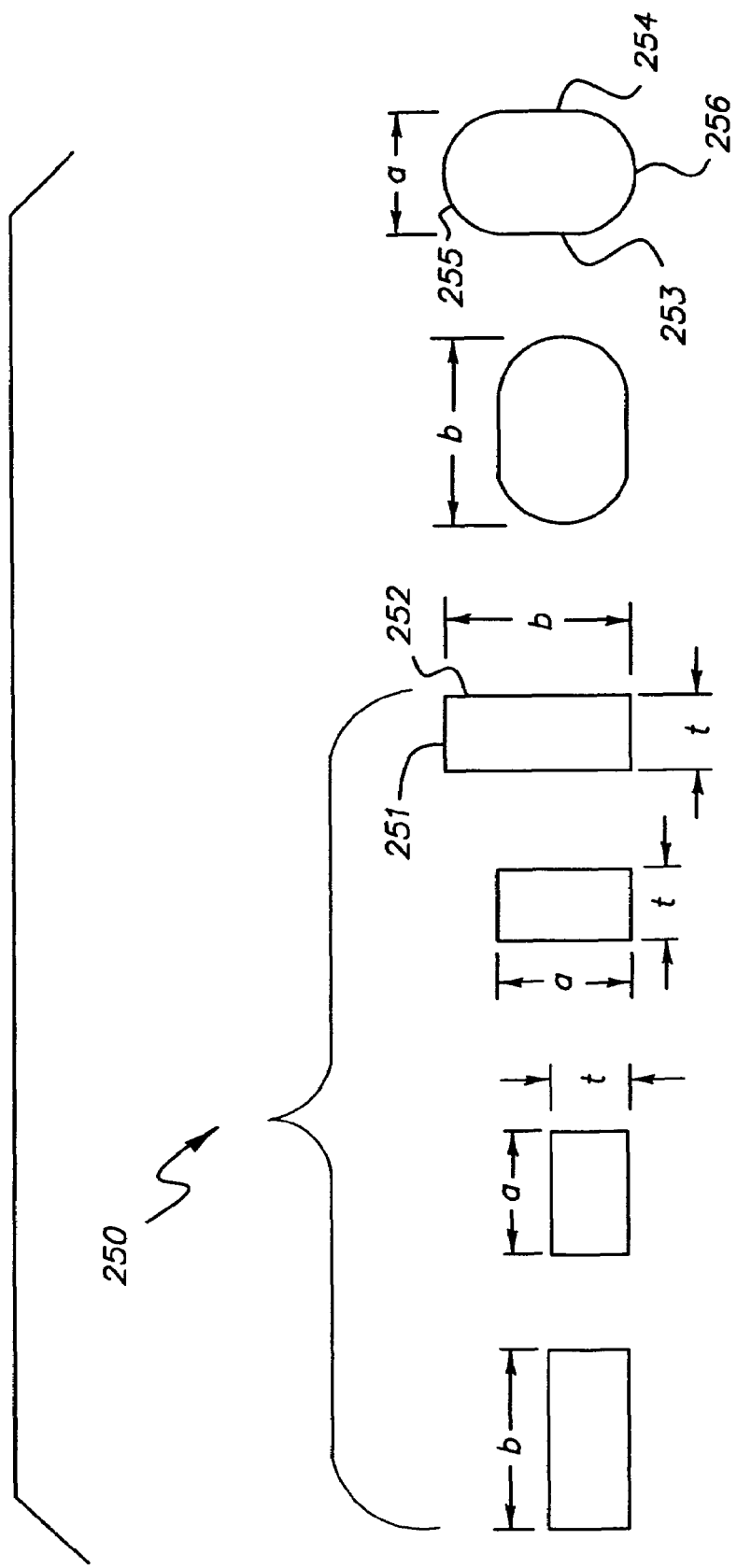
FIG. 4 is a view showing various orientations of an oval component.

FIG. 4 shows an enlarged view of wick 250, which is to be inserted into the wick receptacle 240. In particular, wick 250 has a first face 251 and a second parallel face 252 and that the faces are separated by wick thickness t. Wick 250 also has two parallel sides 253 and 254 which are separated by wick width a. Wick 250 also has two curved ends 255 and 256, the ends of which are separated by wick length b. In one preferred embodiment the wick material is uniform. There are therefore four equivalent preferred orientations in which the wick 250 may be inserted into the receptacle 240. It does not matter whether face 251 or face 252 is located closer to porous media 225. It also does not matter whether parallel side 253 or parallel side 254 is located toward the left side of the ink tank. However, the wick must be oriented in one of these four equivalent preferred orientations if it is to be inserted successfully into receptacle 240. As shown in FIG. 4, in this example, the wick thickness t is less than its width a which is less than its length b. For the case of a circular or square wick (not shown), wick thickness t would still be less than width or length, but in these cases the width would equal the length.

Figure 5:
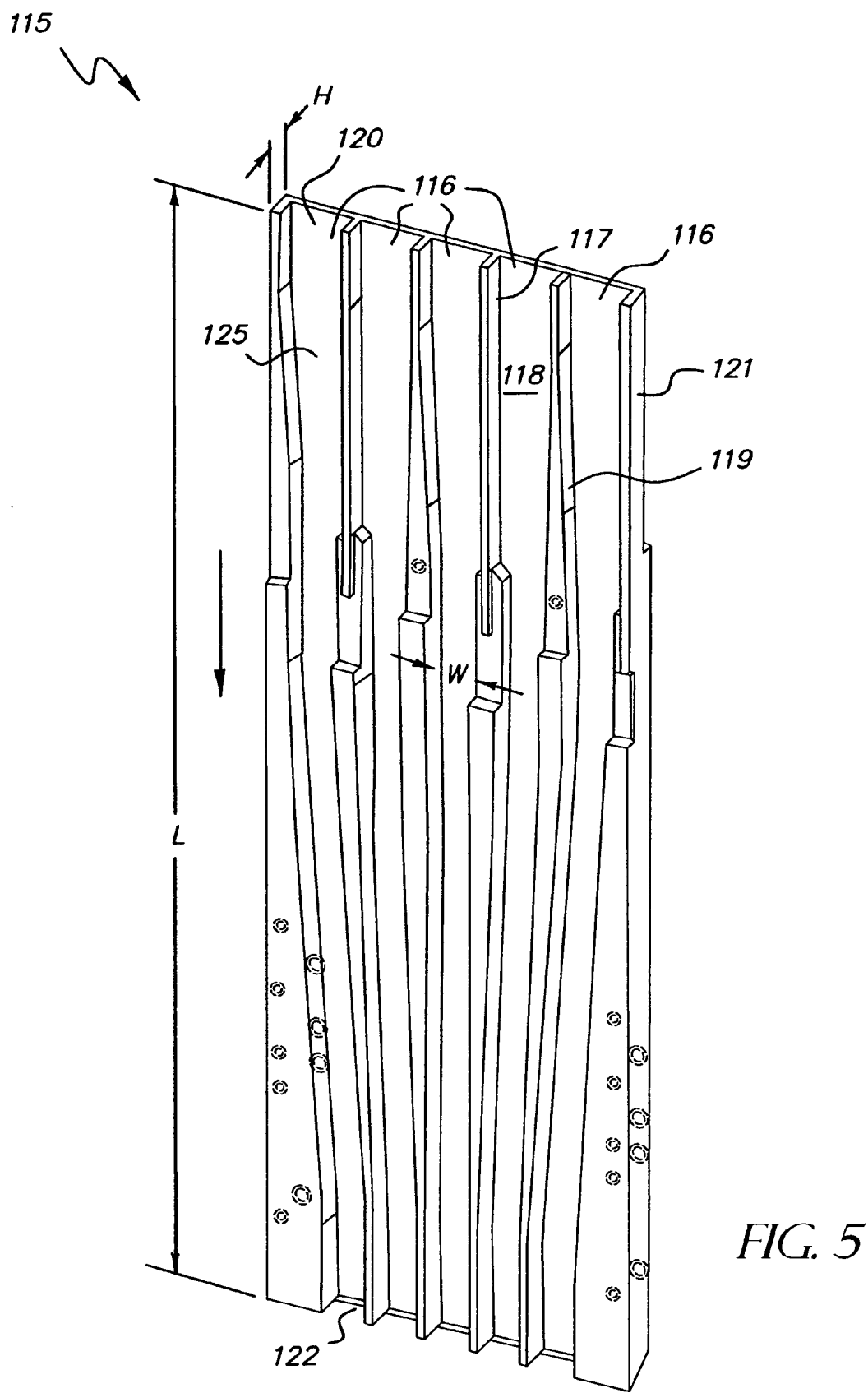
FIGS. 5-9 are views showing portions of the orientating apparatus of FIG. 1.

FIG. 5 shows one preferred embodiment of a feed channel assembly 115 of orienting apparatus 100 configured with five feed channels 116 in order to orient five wicks at a time for insertion into a five-chamber ink tank. In this example, the wicks are components 102 and the terms will be used interchangeably. Each channel has a channel inlet 120 near a top edge that cooperates with the agitator 108 and a channel, and also a channel outlet 122. Base plate 125 forms the floor of each channel 116. Each channel 116 also has two walls. The walls shown in FIG. 5 are of three different types. Straight entry walls 117 have a constant wall width near channel inlet 120. Restricting walls 119 have a wall width that increases from a narrow width near channel inlet 120 to a greater width located at a point partway toward channel outlet 122. Side walls 121 are the walls at the sides of feed channel assembly 115. In feed channel assemblies having multiple channels 116, the walls may also be referred to as lane dividers and the individual channels may be referred to as lanes. All wicks traveling down a particular lane are destined to be fed sequentially into similar receptacle positions on different ink tanks. Wicks which are at the same distance from the channel outlet 122 but in different lanes are destined to be fed at one time into different receptacle positions on the same ink tank.

Geometries of feed channel assembly 115 are designed to allow wicks to pass only if face 251 or face 252 is adjacent channel floor base plate 125, and also only if sides 253 and 254 are adjacent to opposite walls of a channel 116. In other words the longest dimension b of the wick 250 is larger than the narrowest separation W between walls (i.e. at the restricted region 118 of the channel), and the width a of the wick 250 is larger than the distance H from the channel floor base plate 125 to a channel roof plate 123 (to be described below), so that if the wick is to pass, it must be oriented with its longest dimension b substantially parallel to the axis of feed channel 116. In the example shown in FIG. 5, the axis of the feed channel 116 is defined as the direction parallel to a line from the center of channel inlet 120 to the center of channel at the restricted region 118 of the channel. More generally, the channel axis is substantially the direction of motion of the wicks as they move through a channel 116.

As shown in FIG. 5, the walls 117, 119 and 121 are all relatively narrow near channel inlets 120. This allows the channel inlets 120 to be oversized and somewhat larger than wick width a, so that a wick can still enter channel inlet 120 and be misoriented rotationally, as long as its face 251 or 252 is substantially parallel to channel floor base plate 125. Even more beneficial is if the channel inlets 120 are wider than length b of the wick, so that any orientation of the wick is allowed to enter the channel inlets, as long as faces 251 and 252 are substantially parallel to channel floor 125. As the wick travels further along the feed channel 116, it encounters a restricted portion 118 having a narrower feed channel width W which is slightly larger within a small tolerance of the width a of the wick component 102. This restricted portion 118 corresponds to a widening of at least one adjacent restricting wall 119 or a widening of a side wall 121. This causes the wick to rotate so that its long axis b is parallel to the channel axis. This is equivalent to the preferred cross-section of the wick (thickness t times width a) being substantially perpendicular to the channel axis. This determines that components can reach the utilization point only singly and in an oriented state, which improves the performance of the unit, thus avoiding jams and preventing components from being retained together in the staging portion, which already is full of components.

Although it is beneficial to have the feed channel width be large at the channel inlet 120, it may be that the spacing of the wicks in the channels is greater than the spacing of the wick receptacles 240 in the multichamber ink tank 200. To bring the wicks to the right spacing, the walls 117 and 119 between adjacent feed channels 116 become narrow near the channel outlet, and the sidewalls 121 become correspondingly wider in this region, as shown in FIG. 5.

Figure 6:
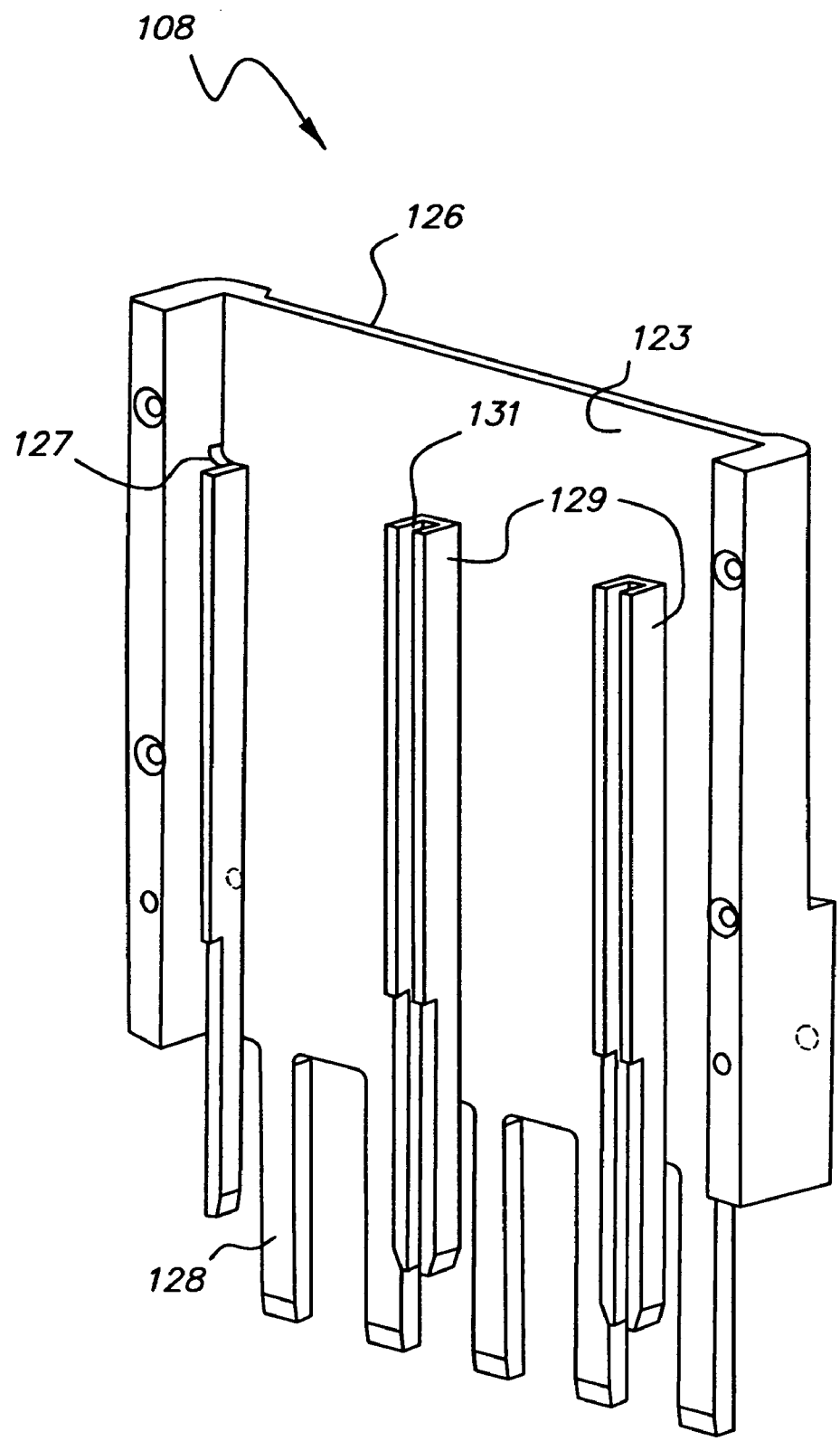
Figure 7:
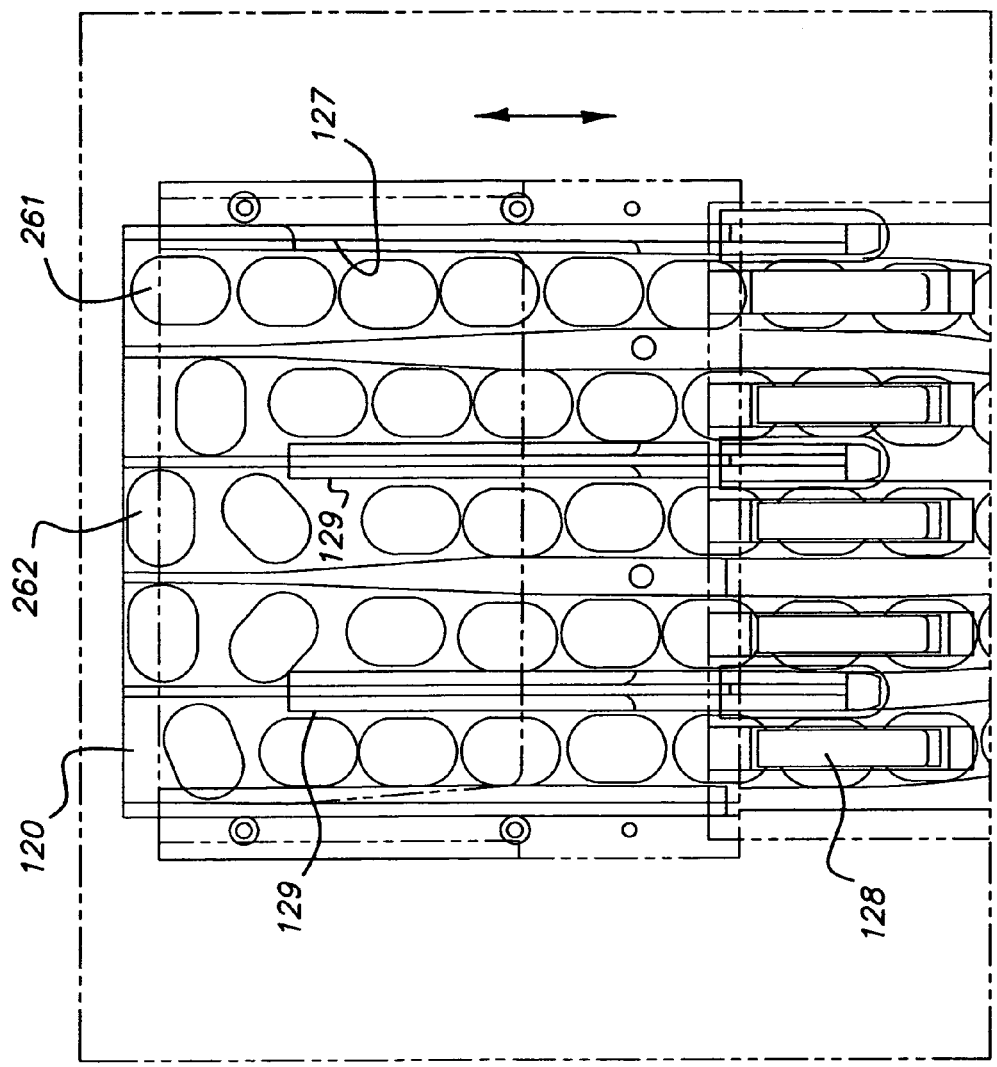
Figure 8:
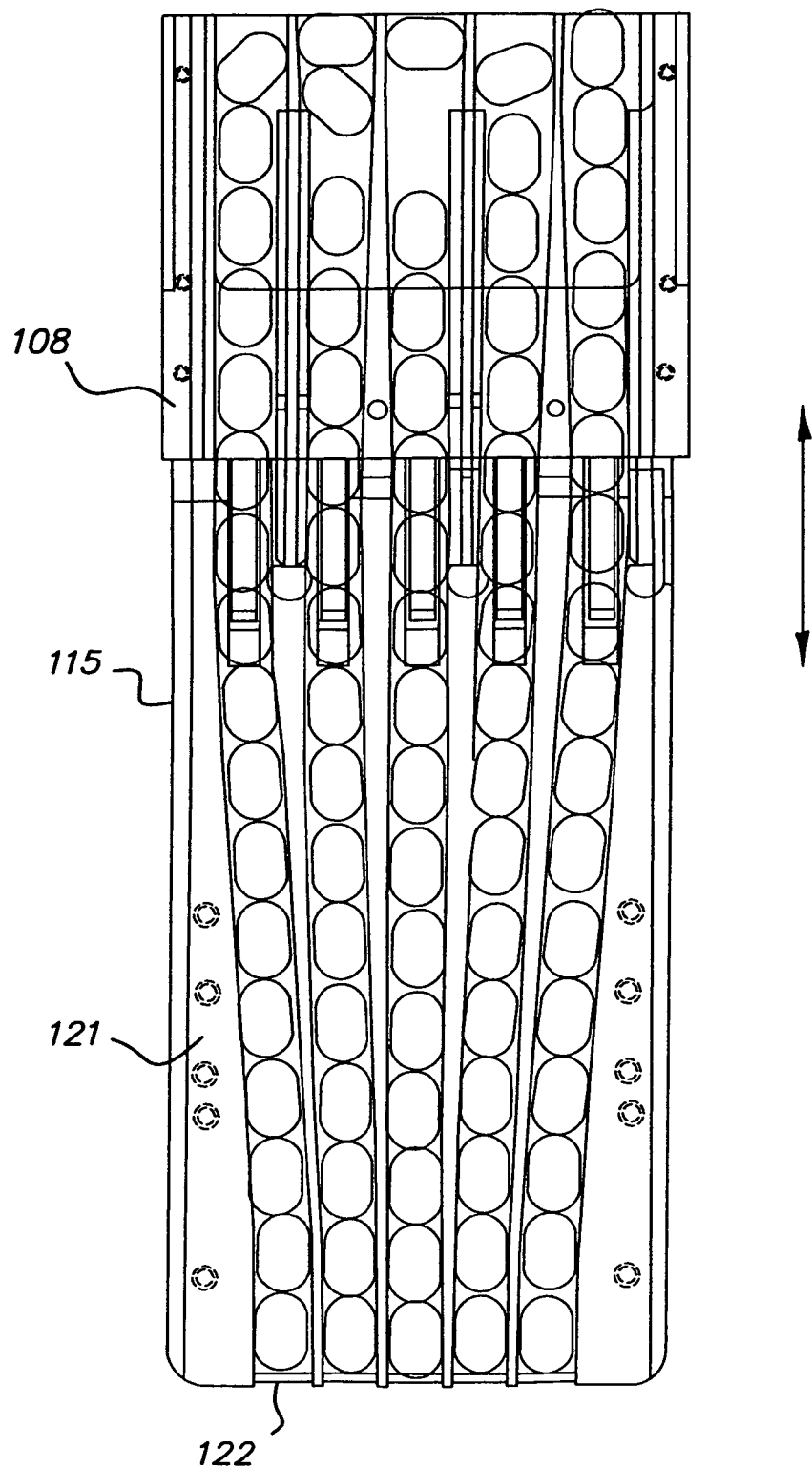

FIG. 6 shows a preferred embodiment of the agitator 108. In this case, the agitation is provided by a mechanical agitator assembly 108 which mates to the feed channel assembly 115. Mechanical agitator assembly 108 consists of a channel roof base plate 123, top edge 126 or surface, single finger features 127, double finger features 129, and channel guards 128. The double finger features 129 consist of two finger features with a groove 131 between them. The grooves 131 mate with straight entry walls 117. Because the straight entry walls 117 have a substantially constant width in the region where they mate with corresponding grooves 131, mechanical agitator assembly 108 is able to move up and down with respect to the fixed feed channel assembly 115. Top edge 126 of the mechanical agitator assembly, sometimes in cooperation with the top edge the channel feed assembly, strikes wicks near hopper outlet 111 and allows them to reorient so that they can enter feed channel inlets 116. There is one finger per feed channel 116. As shown in FIG. 7, when a finger comes into contact with the edge of a misoriented wick 262 near the channel inlet 120, it causes the wick to rotate so that it is enabled enter the more restricted regions of the feed channel 116. As shown in FIG. 8, as the 5 columns of wicks travel down their respective feed channels 116 toward channel outlets 122, the rows of 5 parallel wicks are positioned at a spacing substantially equivalent to the spacing of wick receptacles in a 5 chamber ink tank.

In a preferred embodiment, a drive assembly is attached to the mechanical agitator assembly 108 to power the agitator. The drive assembly induces mechanical agitator assembly 108 to move up and down so that the fingers repeatedly strike components 102 near the channel inlets 120. This provides multiple opportunities for the components 102 to move and be orientated in relation to the channel, including the channel inlet and channel restriction such that the components pass orientated with the component preferred cross-section perpendicular to the channel axis. This motion of the component 102 is vertical, meaning that it has a vertical component, but also allows some rotation or lateral movement to reorient the component to allow passage through the restriction 118. In other embodiments where a moving force other than gravity is provided, the component motion could be primarily horizontal or a combination of vertical and horizontal movements.

Another set of features of mechanical agitator assembly shown in FIG. 6 is the set of channel guards 128. These guards help to prevent wicks from falling out of the feed channels 116 when the agitator is driven up and down.

The surface of the feed channels 116 can be made of appropriate material to effectively move the components at the desired rate. These materials can range from high coefficient of frictions to very low coefficients of friction, which facilitate the sliding of the wicks. Optionally sensors, such as optical sensors, can monitor the feed channels to monitor the proper flow of wicks and prevent wick damage in case of jams.

Figure 9:
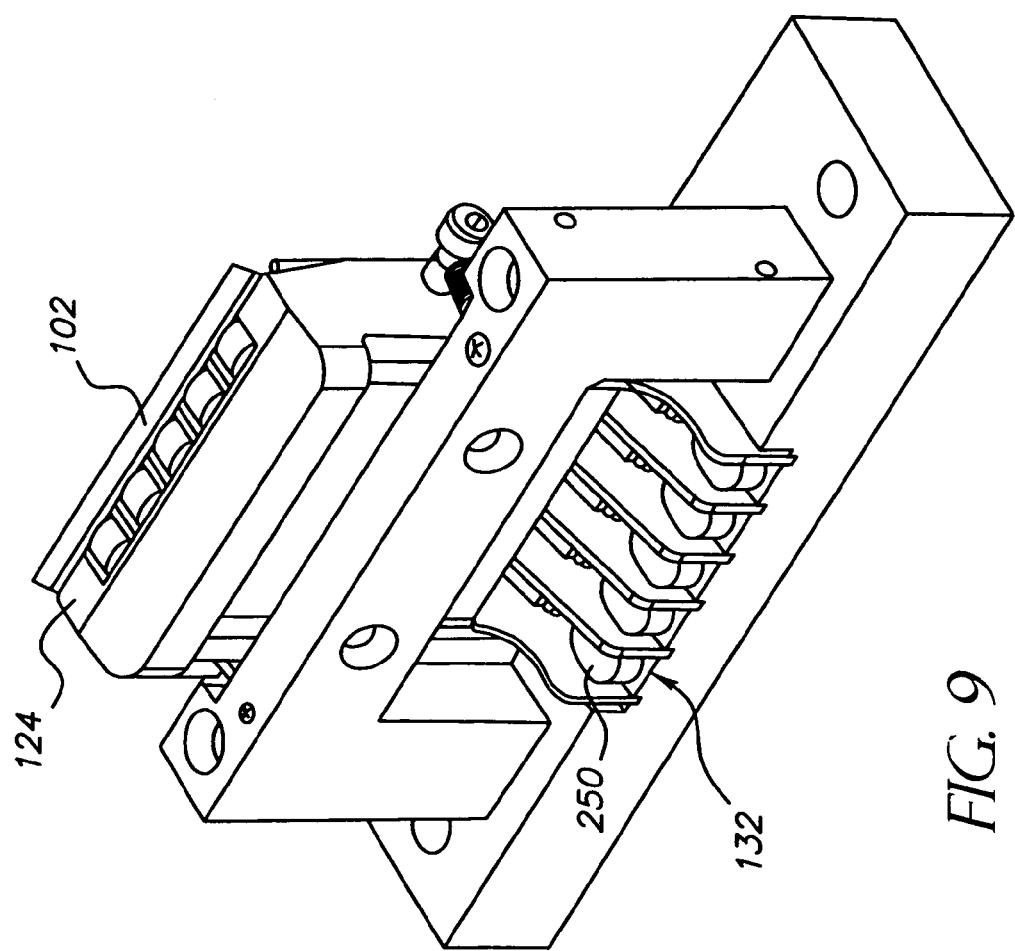

FIG. 1, along with FIG. 9, shows the lower component delivery portion 124, also referred to as an escapement, which can be positioned in order to feed the components 102 to a staging nest 132. The staging nest is the area, at the utilization point, where the components 102 are mated with a receiver. In an embodiment of wick assembly discussed above, the wicks are the components 102 and the receivers are the ink tanks 200 including wick receptacles 240. Optionally there is a cover over a portion or all of the staging nest and the cover, optionally in conjunction with air assist could be used to move the component toward the utilization point. Note that in FIG. 3, the natural orientation of the ink tank is such that the wick receptacles have a horizontal orientation, while the wicks in the feed channel assembly 116 are in a vertical orientation. What the escapement 124 does is to enable dispensing five wicks at a time into staging nest 132, and also rotates the wick from a vertical orientation to a horizontal orientation. This rotation is accomplished by a curved track which begins vertically and then curves to present the wicks horizontally into the staging nest 132.

The dispensing operation may be accomplished in a variety of ways, but essentially the group of five wicks, for example, are held by a barrier, or barrier portion near the entry to the escapement, until the operator pushes a mechanism (or gives a control signal) to dispense the set of wicks into the staging nest 132. The barrier portion could be part of or separate from the escapement. Multichamber ink tanks 200 are successively brought near the staging nest, and the group of wicks is inserted simultaneously into the corresponding wick receptacles 240 in the ink tank 200. Before the component is inserted into the ink tank there is a last chance to clean off any debris. A cleaning device that could be located near the utilization point, as well as one or more other useful locations, could accomplish this. The cleaning device would clean particulate matter and could include a blower, air jet, vacuum or other mechanical, electrical or other cleaning means that one skilled in the art would understand and would be able to clean. Particularly useful in an apparatus like this that can generate static electricity, is an air stream of ionized air.

In comparison the wick agitator is much simpler by design and costs significantly less than commercial vibratory bowls. Testing of the wick feeding system has shown part feeding capabilities of 1-300, preferably 40-300 parts per minute. The process of feeding parts via agitation by filtering out the parts smallest cross-sectional area can be applied to virtually any part. While the embodiment described above detailed the geometries for a components having a length larger than its width which is larger than its thickness, analogous orientating apparatus can readily be designed for square or circular components where length b is the same as width a, but both a and b are larger than thickness t.

Figure 10:
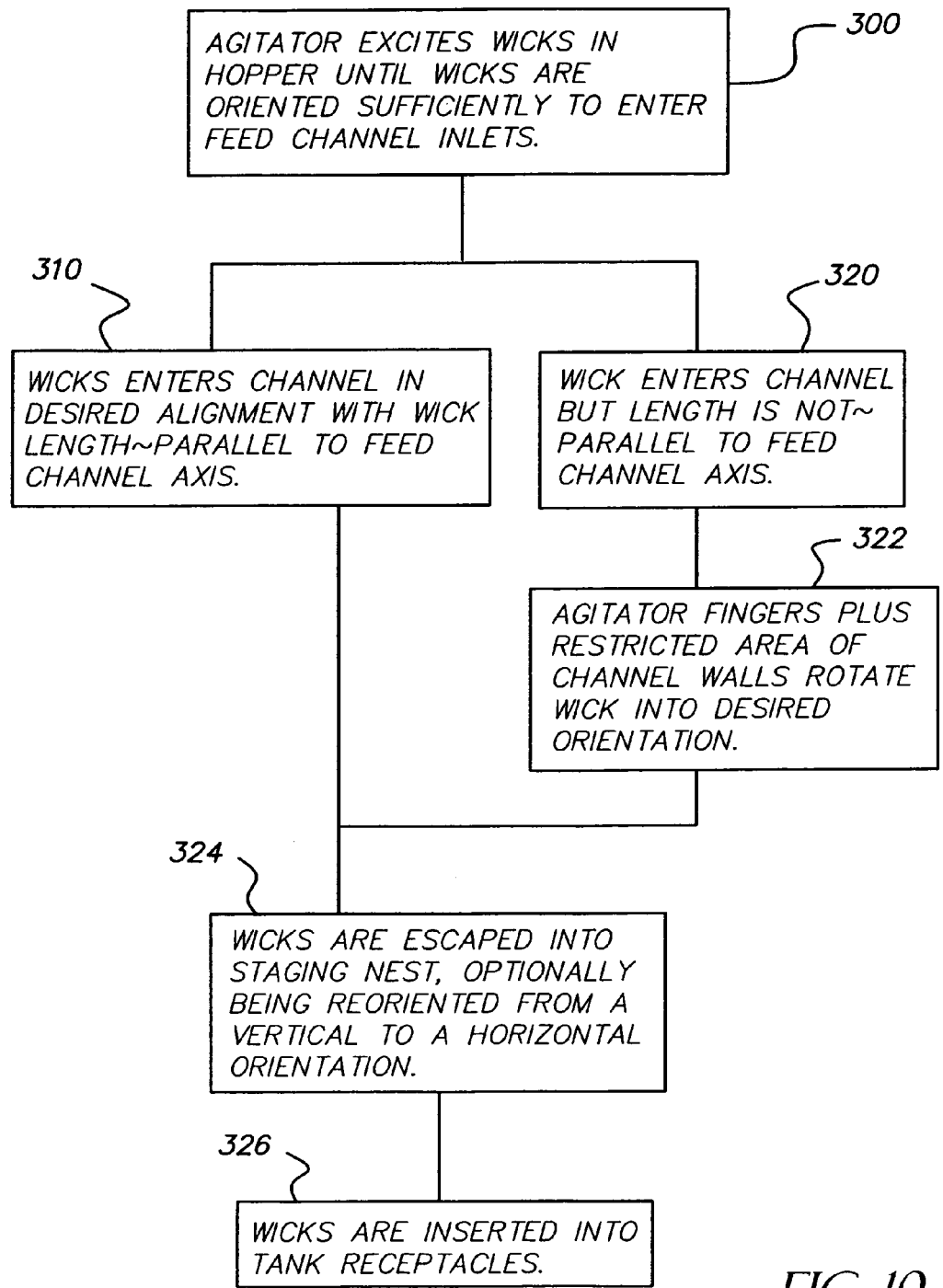
FIG. 10 illustrates a portion of a method of use for the orientating apparatus of FIG. 1.

In one preferred embodiment of a portion of this orientating apparatus, the agitator 108 is driven up and down repeatedly across the channels as represented in FIG. 10. The motion of the agitator produces a "popping" effect at the agitator/hopper interface as represented by step 300. This so-called "popping" effect causes the parts, such as the wicks, to vigorously move about inside the hopper. With the "popping effect" the agitator provides opportunity for the wicks to correctly orient themselves and enter the channels. Wicks such as wick 261 in FIG. 7 that are oriented with length b substantially parallel to the feed channel axis and with faces 251 and 252 parallel to channel floor base plate 125 are granted passage through the channels 116 (step 310 in FIG. 10). Wicks such as wick 262 in FIG. 7 having faces 251 and 252 oriented substantially parallel to channel floor base plate 125, but with length b not substantially parallel to the feed channel axis (step 320) need to be nudged by finger features 127 or 129 so that the fingers and the progressively narrowing walls can rotate the wick into the desired orientation as represented by step 322. This is the only orientation that will be accepted by the channels with the restrictions, so the wicks can move and be dispensed into the staging nest or location as represented by step 324. The wick channels act as reservoirs for oriented parts as the wicks move toward the staging nest (step 324), so that they can be inserted into the wick receptacles on the ink tanks, as represented by step 326.

This orientating apparatus used as an automatic wick orienting solution for wick insertion into the ink tank. This reduces cost and time by eliminating secondary wick insertion stations and operators. The method for assembling a device comprising a receptacle and a component having a smallest physical dimension and having at least one preferred orientation which is related to the smallest physical dimension, the method comprising the following steps providing a batch of non-oriented components in a hopper located vertically above one or more channels into which the components will fit if oriented in the preferred orientation; agitating at least one component in the hopper located adjacent to the inlet of the channel, thereby providing at least one opportunity for the component to become oriented sufficiently to enter the inlet of the channel; and positioning the receptacle below the channel outlet so that oriented parts can be moved into the desired location in the receptacle. The method can also include driving a mechanism up and down relative to the channel, such that the top edge of the mechanism intermittently contacts at least one component in the hopper.

The system works in conjunction with the various sensors that may be associated with an assembly apparatus because the sensor system is capable of optimizing the system performance. One embodiment, for example, would use optical sensors to detect when all the wick channels are full, at which point the agitator would be shut off. This would allow optimization of the number of agitator cycles reducing the general wear of the operating components (i.e. pneumatic slides, cylinders, air consumption, etc. and prevent unnecessary agitation to the wicks (may cause deformation).

The invention has been described in detail with particular reference to certain preferred embodiments thereof, but it will be understood that variations and modifications can be effected within the spirit and scope of the invention.

The invention claimed is:

1. An orientating apparatus for orientating components for receipt at a utilization point, the components each having a preferred cross-section relative to the direction of orientation, comprising:

a. a component source having an inlet and an outlet;
   b. one or more channels, adjacent the component source outlet, each channel having a channel inlet, a channel outlet, a first channel wall, a second channel wall opposed to the first channel wall, a channel axis, a channel restriction; and
   c. an agitator, adjacent the component source outlet said agitator defining a groove mated to only the first channel wall such that the agitator moves relative to the first and second channel walls in a direction parallel to the channel axis, whereby the components pass orientated with a component preferred cross-section perpendicular to the channel axis.

2. The apparatus of claim 1, further comprising a drive assembly attached to the agitator to induce motions of the component in relation to a surface proximate the channel inlet.

3. The apparatus of claim 2, wherein the surface comprises a top edge.

4. The apparatus of claim 1, wherein the first channel wall has a top section nearest to the component source inlet and a bottom section nearest to the component source outlet, the top section having a substantially constant width and the bottom section an increasing width closer to the component source outlet.

5. The apparatus of claim 1, further comprising a finger proximate the first channel wall.

6. The apparatus of claim 1, wherein at least one of the first and second channel walls is a lane divider between two adjacent channels.

7. The apparatus of claim 6, wherein a portion of the lane divider is parallel to a portion of an adjacent lane divider.

8. The apparatus of claim 7, wherein portions of adjacent lane dividers are angled in relation to each other.

9. The apparatus of claim 1, further comprising a staging nest compartment adjacent the utilization point.

10. The apparatus of claim 9, wherein the staging nest compartment is positioned near the channel outlet and substantially perpendicular to the channel axis.

11. The apparatus of claim 1 further comprising a channel floor and a channel roof.

12. The apparatus of claim 1, the channel restriction having an opening, one of whose dimensions is H, and the component having two parallel faces, wherein the distance between the two faces is the smallest dimension of the component, and wherein the distance between the two faces is smaller than opening dimension H.

13. The apparatus of claim 1, further accommodating a receiver at the utilization point.

14. The apparatus of claim 13, the component comprising a wick and the receiver comprising an ink tank.

15. The apparatus of claim 1, further comprising a channel roof proximate the channels.

16. The apparatus of claim 1, the channel further comprising a surface with a lower coefficient of friction than that of the component.

17. The apparatus of claim 1, the component having a predetermined spatial relationship with the channel restriction such that channel restriction does not pass non-oriented components.

* * * * *

UNITED STATES PATENT AND TRADEMARK OFFICE
CERTIFICATE OF CORRECTION

PATENT NO. : 7,464,803 B2  
APPLICATION NO. : 11/491884  
DATED : December 16, 2008  
INVENTOR(S) : Brian J. Cashimere et al.

Page 1 of 1

It is certified that error appears in the above-identified patent and that said Letters Patent is hereby corrected as shown below:

Claim 1, Col. 8, line 5      after "axis," insert --and--  
Claim 1, Col. 8, line 7      after "outlet" insert --,--

Signed and Sealed this

Thirty-first Day of March, 2009

JOHN DOLL  
*Acting Director of the United States Patent and Trademark Office*